Nov. 4, 1958  R. A. KRAFT  2,859,384
INDICATOR SYSTEM FOR SERIES CONNECTED ELEMENTS
Filed March 21, 1955
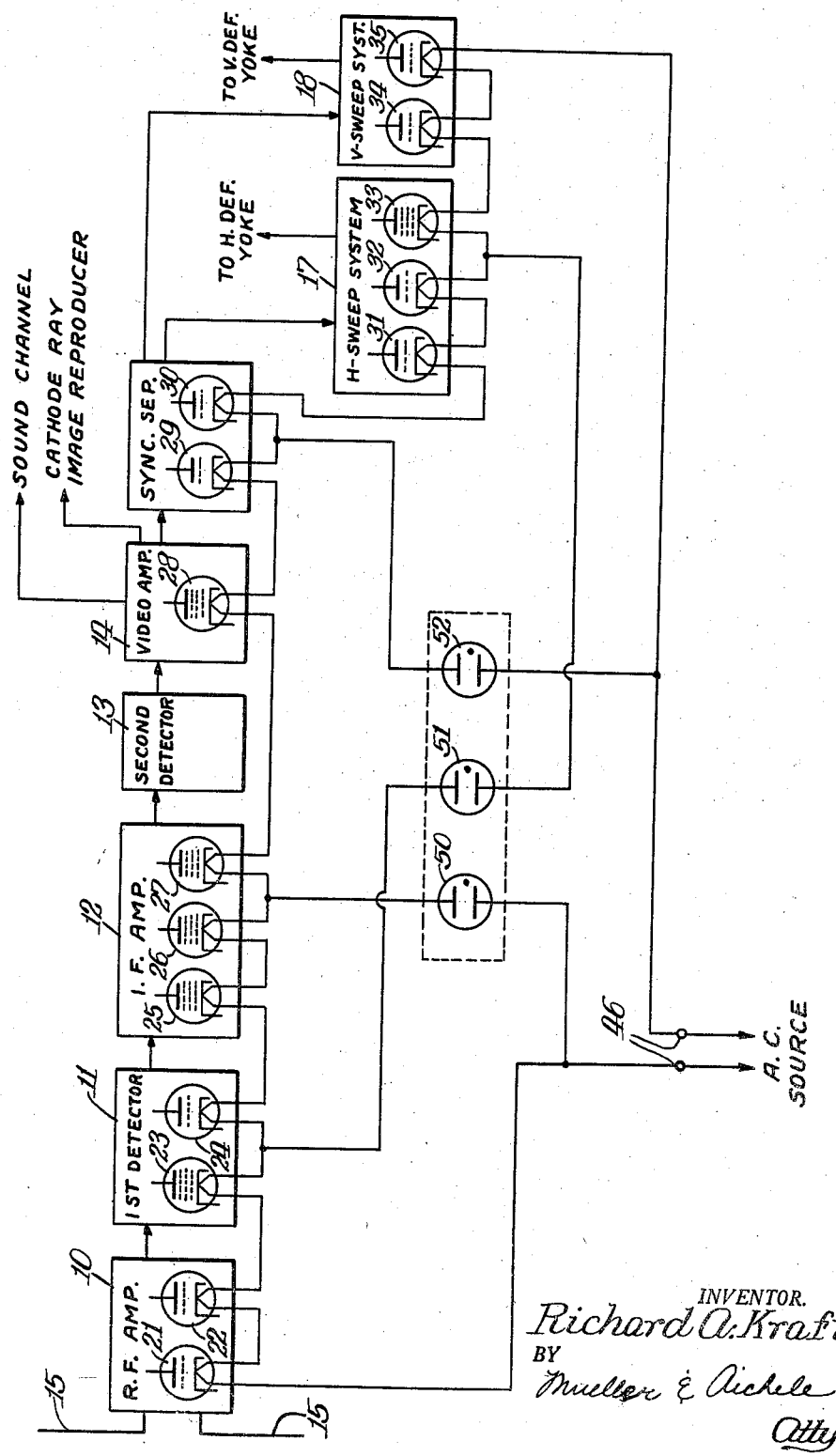
INVENTOR.
Richard A. Kraft,
BY
Mueller & Aichele
Atty's.

United States Patent Office 2,859,384
Patented Nov. 4, 1958

2,859,384

INDICATOR SYSTEM FOR SERIES CONNECTED ELEMENTS

Richard A. Kraft, Elmhurst, Ill., assignor to Motorola, Inc., Chicago, Ill., a corporation of Illinois Application March 21, 1955, Serial No. 495,445

2 Claims. (Cl. 315—135)

This invention relates to electronic apparatus and more particularly to an indicating system for the filament circuits of electron tubes as used in such apparatus.

In much of the present day electronic equipment which utilizes electron tubes, such as radio or television receivers, the filaments or heaters of these tubes are series-connected across a power source, commonly the power available at the usual 110-volt alternating current wall outlet. It is apparent that when one of these filaments becomes open circuited or burns out, the series circuit is broken and none of them is energized. To repair the apparatus, it is then necessary to locate the faulty electron tube and replace it. When the equipment incorporates many tubes, for example, a dozen or more, as is the case of television receivers, it becomes time consuming to find the particular tube which must be replaced. The task is rendered even more burdensome when the tubes are in positions that are normally difficult to reach. Thus, the mere replacement of a burned out tube often requires considerable time and effort for what is normally thought to be one of the simpler repair jobs.

Accordingly, it is an object of the present invention to provide an indicator system for a series filament circuit which facilitates prompt location of an open circuited filament.

Another object of the invention is to provide an indicating system for a series connection of electrical components which is operative to render selective failure indication.

Still another object of the invention is to provide a simple and inexpensive indicating system for a string of series-connected vacuum tube filaments which provide a convenient visual indication of which group of a plurality of groups of filaments includes one which is open circuited.

A feature of the invention is the provision of an improved indicating system to promote rapid location of an open circuit in a series network of electrical components including indicator circuits bridged across groups of the components with successive circuits bridging one or more components in common so that energization of one or more circuits to the operating potential of the series network indicates that such a circuit is across a defective component.

Yet another feature is the provision of an improved filament indicating circuit which includes gaseous discharge indicating lamps bridged across groups of series-connected vacuum tube filaments with successive lamps bridging a group in common so that lighting of two lamps indicates failure of a filament in a commonly bridged group and lighting of one lamp indicates failure in a group bridged only by the single lamp.

Further objects, features and the attending advantages thereof will be apparent from consideration of the following description and drawings in which the figure is a schematic representation of a television receiver utilizing the indicator system of the invention.

In practicing the invention, there is provided an indicating system to facilitate location of an open circuited component in a series-connected network of a multiplicity of such components. The apparatus includes a plurality of indicator circuits bridged across groups of series-connected components, which components may be, for example, electron tube filaments. Successive indicator circuits are connected across one group of the components in common and some of the groups of components are bridged by only one indicator circuit. Each indicator circuit may include a gaseous discharge indicating lamp capable of energization by the potential which is used to operate the series-connected network. If an open circuit should occur in the component included in a particular group, the indicator circuit or circuits bridging that group will be energized due to current flow through the components in other groups. One or more of the indicator circuits will thus be energized to light one or more of the indicating lamps which may be positioned for convenient inspection, thus indicating which group contains the burned out component.

The illustrated television receiver includes a usual radio frequency amplifier 10, first detector 11, intermediate frequency amplifier 12, second detector 13, and video amplifier 14; all cascade connected in well-known manner. The input terminals of amplifier 10 are connected to a suitable antenna 15, and the output terminals of amplifier 14 are connected to the sound channel of the receiver and to a cathode-ray image reproducer. Amplifier 14 is also connected to a synchronizing signal separator 16 which, in turn, is connected to a horizontal sweep system 17 and to a vertical sweep system 18. The sweep systems are connected to the horizontal and vertical deflection yokes of the reproducer.

Included in the various stages of the receiver are electron tubes, such as tubes 21—35 which perform the well-known functions of the labelled blocks with which they are respectively associated. In the circuit shown, fifteen electron tubes in all are illustrated. The filaments or heaters of all the tubes are shown series-connected to a source 46 which may be adapted to be coupled to a 110-volt alternating current wall outlet or power line in order to supply power for the filaments. It is not intended herein to indicate any particular order of connecting the filaments, the one illustrated being shown as an example for purposes of explanation.

A gaseous discharge indicating lamp 50 is shown bridged across the filaments of a first group of tubes 21—23, and the filaments of a second group 24—26. A second gaseous discharge indicating lamp 51 is shown bridged across the filaments of the second group 24—26 and across the filaments of a third group 27–29 and of a fourth group 30–32. A third gaseous discharge indicating lamp 52 is bridged across the fourth group and the filaments of a fifth group 33–35. These three indicating lamps 50—52 may be positioned on the chassis of the receiver so that they are conveniently within the view of a serviceman. The lamps may be of a type which will be energized when a potential approximately equal to that supplied by plug 46 to energize the filaments is impressed thereacross.

In accordance with the invention, lighting of one or more of indicating lamps 50—52 is used as an indication that a filament in one of the five groups has open circuited. It may be seen that if a filament in group 21–23 should burn out, the energizing potential would be impressed through the series filaments of the tubes 27—35 upon lamp 50 so that this lamp alone would be lighted. While if a filament in group 24–26 should burn out, the line potential would be impressed upon lamp 50 as before and at the same time this potential would be impressed upon lamp 51 through groups 21–23 and 33–35, thus lighting both lamps 50 and 51.

Similarly, lamp 51 alone would be lighted when a filament in group 27–29 is open circuited since it would be energized through groups 21–23 and 33–35. It is also apparent that lamps 51 and 52 both would be lighted to indicate an open circuit in group 30–32, while an open circuit in group 33–35 would be indicated by lighting of lamp 52 alone.

It may be seen that the groups need not necessarily contain three vacuum tube filaments and that the grouping need not necessarily consist of five groups. However, the particular circuit shown requires but three gaseous discharge lamps to narrow down the location of a faulty tube to a particular group of three out of a possible fifteen. It is, therefore, possible for a serviceman to merely replace or otherwise check only the filaments in a particular group indicated.

The invention provides, therefore, a simple system for giving a convenient indication of an open circuit in a series connection including many electrical components. The invention renders selective failure indication in electronic apparatus such as a television receiver which includes many electron tubes where ordinarily the failure of one would require considerable time in the performance of the tedious task of locating a faulty filament.

I claim:

1. An indicating system for a plurality of at least four series-connected electrical components adapted to be connected to potential supply means for energizing the same, said system including in combination, a plurality of at least two indicator circuits each coupled across a plurality of said components with successive circuits being connected across at least one component in common with a preceding indicator circuit and across at least one component exclusively, the number of indicator circuits being less than the number of electrical components by at least two, said indicator circuits being adapted to be energized to an indicating condition by the application thereto of a potential greater than the potential normally applied thereto by the voltage drop across said components, with an open circuit in a component increasing the potential across each indicator circuit connected thereacross through the circuit provided by the other components, said increased potential across an indicator circuit energizing the same to an indicating condition and thereby indicating failure of a component across which such indicator circuit is bridged.

2. An indicator system in accordance with claim 1 wherein each of the electrical components includes at least one filament for a vacuum tube and each of said indicator circuits includes a neon indicating bulb.

References Cited in the file of this patent

UNITED STATES PATENTS

| | | |
|---|---|---|
| 1,960,408 | Brach | May 29, 1934 |
| 2,531,345 | Rickard | Nov. 21, 1950 |